(12) United States Patent
Nemawarkar et al.

(10) Patent No.: US 9,996,262 B1
(45) Date of Patent: Jun. 12, 2018

(54) METHOD AND APPARATUS TO ABORT A COMMAND

(71) Applicant: Seagate Technology LLC, Cupertino, CA (US)

(72) Inventors: Shashank Nemawarkar, Austin, TX (US); Chris Randall Stone, Elgin, TX (US); Balakrishnan Sundararaman, Austin, TX (US)

(73) Assignee: Seagate Technology LLC, Cupertino, CA (US)

( * ) Notice: Subject to any disclaimer, the term of this patent is extended or adjusted under 35 U.S.C. 154(b) by 3 days.

(21) Appl. No.: 14/936,573

(22) Filed: Nov. 9, 2015

(51) Int. Cl.
*G06F 3/06* (2006.01)

(52) U.S. Cl.
CPC .......... *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 4,888,691 | A * | 12/1989 | George | G06F 3/0601 710/22 |
| 5,963,973 | A * | 10/1999 | Vanhove | G06F 12/0833 711/118 |
| 6,710,963 | B2 * | 3/2004 | Iida | G11B 19/04 360/69 |
| 7,836,269 | B2 | 11/2010 | Obereiner et al. | |
| 9,052,835 | B1 * | 6/2015 | Darrington | G06F 3/0659 |
| 9,122,401 | B2 | 9/2015 | Zaltsman et al. | |
| 2002/0129203 | A1 * | 9/2002 | Gagne | G06F 11/1451 711/114 |
| 2004/0205288 | A1 * | 10/2004 | Ghaffari | G06F 3/0613 711/100 |
| 2004/0264284 | A1 | 12/2004 | Priborsky et al. | |
| 2005/0120151 | A1 * | 6/2005 | Furukawa | G06F 3/061 710/33 |
| 2005/0210190 | A1 * | 9/2005 | Yamada | G06F 3/061 711/112 |
| 2006/0149940 | A1 | 7/2006 | Mukherjee | |
| 2007/0005896 | A1 * | 1/2007 | Chang | G06F 3/0613 711/120 |
| 2009/0113430 | A1 | 4/2009 | Riley | |

(Continued)

*Primary Examiner* — Mano Padmanabhan
*Assistant Examiner* — Jean C Edouard
(74) *Attorney, Agent, or Firm* — Cesari & Reed, LLP; Kirk A. Cesari; Christian W. Best

(57) ABSTRACT

Systems and methods are disclosed to abort a command at a data storage controller, in accordance with certain embodiments of the present disclosure. In some embodiments, an apparatus may comprise a data storage controller configured to receive an abort indicator from a host device, generate an abort tracking indicator at a receiving unit configured to receive commands from the host device, monitor to determine when the selected command is received at the receiving unit based on the abort tracking indicator, and abort the selected command when the selected command is received at the receiving unit. In some embodiments, the data storage controller may generate an abort tracking indicator at a completion unit configured to notify the host device of completed commands, and monitor for the selected command at the completion unit based on the abort tracking indicator.

20 Claims, 8 Drawing Sheets

(56) References Cited

U.S. PATENT DOCUMENTS

| | | | |
|---|---|---|---|
| 2009/0172257 A1* | 7/2009 | Prins | G06F 13/1657 |
| | | | 711/103 |
| 2009/0327638 A1 | 12/2009 | Buch | |
| 2010/0262738 A1 | 10/2010 | Swing et al. | |
| 2010/0332884 A1* | 12/2010 | Yoshida | G06F 1/3203 |
| | | | 713/324 |
| 2012/0005404 A1* | 1/2012 | Raz | G06F 3/0617 |
| | | | 711/103 |
| 2012/0246435 A1 | 9/2012 | Meir et al. | |
| 2013/0067143 A1 | 3/2013 | Hasegawa et al. | |
| 2013/0304998 A1* | 11/2013 | Palmer | G06F 3/0619 |
| | | | 711/154 |
| 2014/0325148 A1* | 10/2014 | Choi | G06F 3/0611 |
| | | | 711/114 |
| 2014/0331001 A1* | 11/2014 | Liu | G06F 3/0659 |
| | | | 711/103 |
| 2015/0074345 A1* | 3/2015 | Zhu | G06F 12/0871 |
| | | | 711/103 |
| 2015/0089305 A1* | 3/2015 | Baumeister | G06F 13/24 |
| | | | 714/51 |
| 2015/0178017 A1* | 6/2015 | Darrington | G06F 3/0659 |
| | | | 710/5 |
| 2015/0186068 A1* | 7/2015 | Benisty | G06F 3/0673 |
| | | | 711/154 |
| 2015/0234601 A1 | 8/2015 | Tsai et al. | |
| 2015/0261631 A1* | 9/2015 | Kurihara | G06F 11/0793 |
| | | | 714/6.11 |
| 2016/0034187 A1* | 2/2016 | Desai | G06F 3/061 |
| | | | 711/102 |

* cited by examiner

METHOD AND APPARATUS TO ABORT A COMMAND

SUMMARY

In certain embodiments, an apparatus may comprise a data storage controller configured to receive an abort indicator from a host device, the abort indicator including a command identifier for a selected command to be aborted, generate a first abort tracking indicator at a receiving unit configured to receive commands from the host device, monitor to determine when the selected command is received at the receiving unit based on the first abort tracking indicator, and abort the selected command when the selected command is received at the receiving unit.

In certain embodiments, an apparatus may comprise a data storage controller configured to receive an abort indicator from a host device, the abort indicator including a command identifier for a selected command to be aborted, generate a first abort tracking indicator at a completion unit configured to notify the host device of completed commands, monitor for the selected command at the completion unit based on the second abort tracking indicator, and abort the selected command when the selected command is received at the completion unit.

In certain embodiments, a method may comprise receiving an abort command from a host device at a receiving circuit of a data storage controller, the abort command including a command identifier for a selected command to be aborted, and the receiving circuit configured to receive commands from the host device. The method may further comprise generating a first abort tracking indicator at the receiving circuit, monitoring to determine when the selected command is received at the receiving circuit based on the first abort tracking indicator, generating a second abort tracking indicator at a completion circuit configured to notify the host device of completed commands, monitoring for the selected command at the completion circuit based on the second abort tracking indicator, and aborting the selected command when the selected command is received at the receiving circuit or the completion circuit.

DETAILED DESCRIPTION

Figure 1:
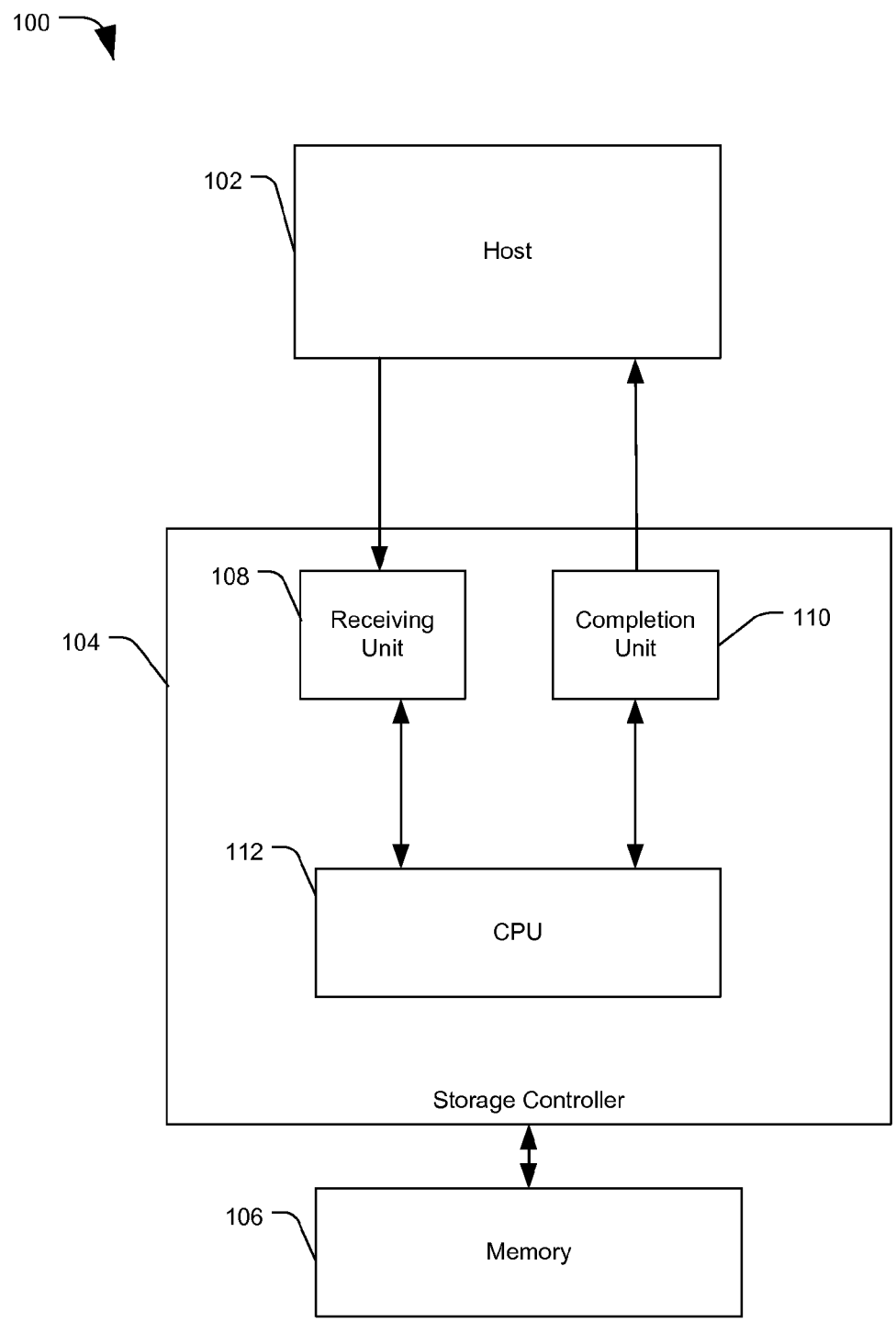
FIG. 1 is a diagram of a system configured to abort a command, in accordance with certain embodiments of the present disclosure.

In the following detailed description of certain embodiments, reference is made to the accompanying drawings which form a part hereof, and in which are shown by way of illustration of example embodiments. Features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer usable medium having computer readable program code means embodied therein or a memory device storing program code or firmware, that includes instructions that when executed, cause a processor device to perform the methods.

Host devices, such as server devices, desktop computers, laptop computers, etc. may issue commands to attached devices, such as data storage devices. The commands may include input or output commands (e.g. read, write, or erase data storage commands), administrative commands (e.g. commands to identify the attached device, determine device features, set parameters for the device, etc.), or other types of commands. At times, a host device may selectively abort a command that the host has issued. For example, a host may abort a command when an associated running application needs to be terminated, when the command has reached a timeout threshold without completing, or based on other factors.

However, in some embodiments locating, isolating, or terminating a specific command may prove difficult. Aborting a particular command may be particularly problematic in devices configured to process multiple commands simultaneously, to process commands out of a predefined order, or in other circumstances. Some implementations of aborting a selected command at a storage device may involve disrupting other commands not designated for aborting, or otherwise negatively impact the performance of the device or the host.

Problems in aborting may arise when a device is receiving or processing commands out of the order in which the commands were generated. Commands may be received or processed out of order when the commands are received from multiple hosts, multiple computing cores of a single host, multiple computation threads from one or more cores, in other circumstances, or any combination thereof. For example, a host device may have multiple command queues into which the host places commands for execution by the attached device. In some embodiments, these commands may not be serviced by the device in the order in which they were placed into queue. In some embodiments a device may receive an abort command directing the device to abort a command that has not yet been received by the device. Locating and aborting commands that may be at multiple potential stages of execution within a device, or not even received yet, may present difficulties for a device. An example system configured to address problems related to command aborting is depicted in FIG. 1.

FIG. 1 is a diagram of a system 100 configured to abort a command, in accordance with certain embodiments of the present disclosure. System 100 may include a host 102, a storage controller 104, and a memory 106. In some embodiments, storage controller 104 and memory 106 may together comprise a data storage device, such as a solid state drive (SSD), a hard disc drive (HDD), or a combination thereof. In some embodiments, the storage controller 104 may control access to a single memory (e.g. a stack of hard disc platters), or the storage controller 104 may control access to a plurality of homogeneous or heterogeneous memories, such as in a network attached storage (NAS) environment. In some embodiments, the host 102 may issue commands, such as input-output (I/O) commands, which are received by the storage controller 104. The storage controller 104 may process the I/O commands and initiate read, write, erase, or other operations at memory 106. The storage controller 104 may return a command status indicator to the host 102 once the command has completed or otherwise terminated. In some embodiments, the storage controller 104 may be a controller for a nonvolatile memory express (NVMe)-based storage device configured to communicate with the host 102 via a peripheral component interconnect express (PCIe) communication bus; however, other embodiments are also possible. NVMe is a specification for accessing some nonvolatile memory devices, such as SSDs, HDDs, hybrid devices including multiple types of storage mediums, or any combination thereof. The NVMe specification offers functionality which takes advantage of the low latency and parallelism provided by SSDs and PCIe communication.

The storage controller 104 may include one or more control circuits, processors, memories (e.g. non-volatile memory, Dynamic Random Access Memory (DRAM), other types of memory, or any combination thereof), firmware, software, communication busses, other components, or any combination thereof. In some embodiments, the storage controller 104 may include a receiving unit 108, a completion unit 110, and a central processing unit (CPU) 112. The receiving unit 108, completion unit 110, and CPU 112 may include one or more chips, integrated circuit (ICs), or other circuits, and may additionally include software or firmware to control one or more operations.

The receiving unit 108 may be configured to receive commands from the host 102, and determine how or where to direct the command within the storage controller 104. For example, commands received by the receiving unit 108 may be directed to a buffer memory or other command queue, directed to the CPU 112, or otherwise routed for further processing. In some embodiments, the host 102 may transmit commands directly to the storage controller 104. In some embodiments, the host 102 may transmit a command indicator, such as a "doorbell" signal, notifying the storage controller 104 that a command is pending and identifying how or where the command may be retrieved at the host. The receiving unit 108 may receive the command indicator, and then retrieve the identified command from the host 102. In some embodiments, the receiving unit 108 may initially receive every command from the host 102 to the storage controller 106, and may therefore act as a first "gatekeeper" for received commands. Other embodiments are also possible.

The completion unit 110 may be configured to transmit to the host 102 a status indicator for commands received from the host 102. For example, the completion unit 110 may receive a notification from the CPU 112 or another component of the storage controller 104 that an I/O operation has been completed successfully. The completion unit 110 may then store the related command identifier (ID) to a completion queue on the host 102, to notify the host that the command was completed successfully. In some embodiments, the completion unit 110 may transmit data requested by a command, such as a file or data associated with a read request. In some embodiments, read data may be stored to the host 102, such as by another component of the memory 106 or storage controller 104, before the completion unit 110 notifies the host 102 that the data has been read and stored to the host 102 successfully. The completion unit 110 may receive a notification from other components of the storage controller 104 for most or every completed command which was received from the host 102, and may thereby act as a final "gatekeeper" for every completed host command. Other embodiments are also possible.

The CPU 112 may perform processing for received commands, control the operation of components of the storage controller 104, control or generate signals or commands to devices attached to the storage controller 104 such as memory 106 or host 102, perform other operations, or any combination thereof.

In some embodiments, the host 102 may issue an abort command, directing the storage controller 104 to abort execution of a previous command from the host 102. The abort command may include information identifying the command selected for aborting, such as a command ID, a host submission queue (e.g a submission queue ID, or SQ ID) into which the selected command was placed for retrieval by the storage controller 104, or other information. The abort command may be received at the receiving unit 108, which may direct the abort command to the CPU 112. The CPU may implement procedures to locate and abort the selected command based on the abort command.

In some embodiments, an abort command may be received by the storage controller 104 before the selected command designated for aborting. For example, the selected command may include an I/O command placed into a host submission queue for retrieval by the storage controller 104, while the abort command may include an administrative command placed into a separate administrative queue ("admin queue"). In some embodiments, admin commands may be given priority over I/O commands, or I/O commands may be buffered for logical grouping processes, or some other host 102 or storage controller 104 implementation may cause commands to be received or processed out-of-order. Accordingly, in some embodiments the CPU 112 may generate, at the receiving unit 108, an abort tracking indicator identifying the selected command. For example, the receiving unit 108 may include some number of abort registers, and the CPU 112 may store the selected command ID or other identifying information into one of the abort registers. The receiving unit 108 may be configured to compare incoming commands against the abort tracking indicator to detect if the selected command is received. Non-selected commands may continue to be executed and processed as normal. When a command matching the abort tracking indicator is received, rather than forwarding the command for processing, the receiving unit 108 may discard or terminate the command and notify the CPU 112 that the selected command was found and aborted. The CPU 112 may then direct the completion unit 110 to notify the host 102 that the abort command was completed successfully.

In some embodiments, the CPU 112 may generate an abort tracking indicator for the selected command at the completion unit 110. For example, the command ID or other identifying information may be stored to a register, to a table in memory, or otherwise generated for use by the completion unit 110. The completion unit 110 may compare completed command identifiers against the abort command identifier to determine if the selected command has been processed and reached the completion unit 110. Non-selected commands may continue to be processed as normal, with the completion unit 110 sending command completion notifications to the host 102. If a command is received at the completion unit 110 matching the selected command, rather than notifying the host 102 that the command has completed, the completion unit 110 may notify the CPU 112 that the selected command was located. The completion unit 110 may notify the host 102 that the abort command was completed successfully, and in some embodiments may return a status identifier for the selected command indicating that the command was aborted. For example, assume that the selected command was a read command, and that the read data was already stored to the host 102. On a normal completion, the completion unit may notify the host 102 that the read completed successfully, and notify the host where the data was stored. However, if the selected command was identified for aborting at the completion unit 110, the completion unit 110 may not identify whether the data was stored, and instead may only indicate that the command was aborted. Accordingly, the host 102 may not update data mapping tables to reflect the received data, and the memory locations where the read data was stored may still be available for storing new data and being overwritten.

When an abort command has been successfully executed and reported to the host 102, the CPU 112 may clear any abort tracking indicators at the receiving unit 108, the completion unit 110, or elsewhere in the storage controller 104. The CPU 112 may perform other processes to identify and abort selected commands beyond setting up abort tracking indicators in the receiving unit 108 and completion unit 110. For example, the storage controller 104 may maintain a table of commands being processed at the storage controller 104, for example in a static random access memory (SRAM) on the storage controller 104. The table of commands may be checked by components of the storage controller 104 as the command moves through a processing pipeline. The processing pipeline, sometimes referred to as an input output (I/O) pipeline, may comprise one or more modules configured to implement I/O operations. Modules may include controllers, circuits, processors, other processing engines configured to perform command processing, or any combination thereof. In some embodiments, modules may include firmware or instruction sets that, when executed, cause a processor to perform command processing.

The CPU 112 may search the command table to determine if the selected command is in the table, and if so, to set an "abort bit" or similar abort flag associated with the selected command to "true" in the command table. If a storage controller 104 component accesses the table of commands and determines that the abort bit for a current command is set to "true," the component may abort the command and notify the CPU 112, which may in turn direct the completion unit 110 to notify the host 102. By generating abort tracking indicators at the receiving unit 108 and completion unit 110, the storage controller 104 can still abort a selected command in instances where the selected command is received after the CPU checks the command table, or where the selected command completes after receiving the abort command but before the CPU 112 can locate the command in the command table.

As described above, the storage controller 104 may maintain a table of commands being processed. A method of receiving commands for processing and generating entries in a command table is discussed in relation to FIG. 2.

Figure 2:
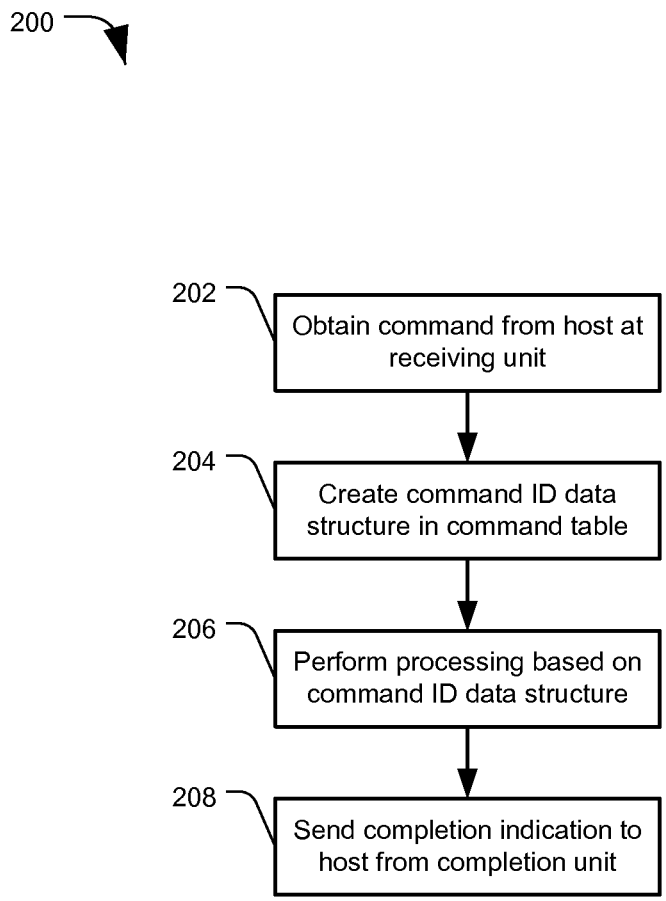
FIG. 2 is a flowchart of a method to abort a command, in accordance with certain embodiments of the present disclosure.

FIG. 2 is a flowchart of a method 200 to abort a command, in accordance with certain embodiments of the present disclosure. The method 200 may include a method for processing a command at a storage controller, such as storage controller 104 of FIG. 1. The method 200 may include obtaining a command from a host at a receiving unit of a storage controller, at 202. The receiving unit may correspond to receiving unit 108 of FIG. 1. In some embodiments, the method 200 may include receiving a command "doorbell" or other indicator that a host command is ready. The indicator may include information about a pending command, such as a command ID and a submission queue ID indicating a command queue from which the pending command may be retrieved. Obtaining a command, at 202, may include retrieving a pending command from a submission queue at the host.

The method 200 may include creating a command ID data structure in a command table stored at the storage controller, at 204, based on the command obtained at 202. For example, the storage controller may maintain a table in an SRAM or other memory of the storage controller. The table may include a set of command ID data structures, pointers to command ID data structures, or may otherwise include information on commands received for execution. The command ID data structure may include the command obtained from the host and other associated control information. For example, the command ID data structure may include the command ID and submission queue ID (SQ ID) received from a host, the type of command, data to read or write or a storage location therefor, an indicator of whether the command is still valid, an abort bit indicating whether the command has been marked for aborting, other information, or any combination thereof. The command table may be accessed by components of a processing pipeline within the storage controller to determine or update the status of commands during processing.

The method 200 may include performing processing based on the command ID data structure, at 206. In some embodiments, circuits or modules of an I/O pipeline may access the command table to determine the type of command and how to proceed with processing. For example, a cache module may consult the command table to determine that a read command was received from a host, the read command including an LBA range to read. The cache module may determine whether the LBA range is at least partially stored to a cache memory (e.g. a DRAM connected to the storage controller). If so, the cache module may direct retrieval of the data from the cache memory and storing the data to the host. If the requested LBA range was not completely stored in the cache, the cache module may notify a Flash access module of the pending command. The Flash access module may consult the command table to determine LBAs to retrieve per the command, and may send instructions to a Flash memory connected to the storage controller to retrieve the designated LBAs and store the associated data to the host. Other processing may also be performed. In some embodiments, the components of the processing pipeline may check whether an "abort bit" is set for the current command. If it is, the component may abort processing of the command, may notify the CPU that the command was aborted, may update a status of the command in the command table, or may perform other functions.

Once the processing for a command is completed, the completion unit may send an indication to the host, at 208, such as by storing information on the completed command to a completion queue of the host device. If the command was aborted, the completion unit may send a completion indication for the abort command associated with the aborted command. In some embodiments, instead of or in addition to sending a completion indication for the abort command, the completion unit may send an abort indication for the aborted command itself. For example, if command ID 1234 was aborted, the completion unit may store an indicator in a host completion queue, such as "Command ID: 1234; Status: Aborted". Other embodiments are also possible. An example embodiment of a storage controller including an I/O pipeline is depicted in FIG. 3.

Figure 3:
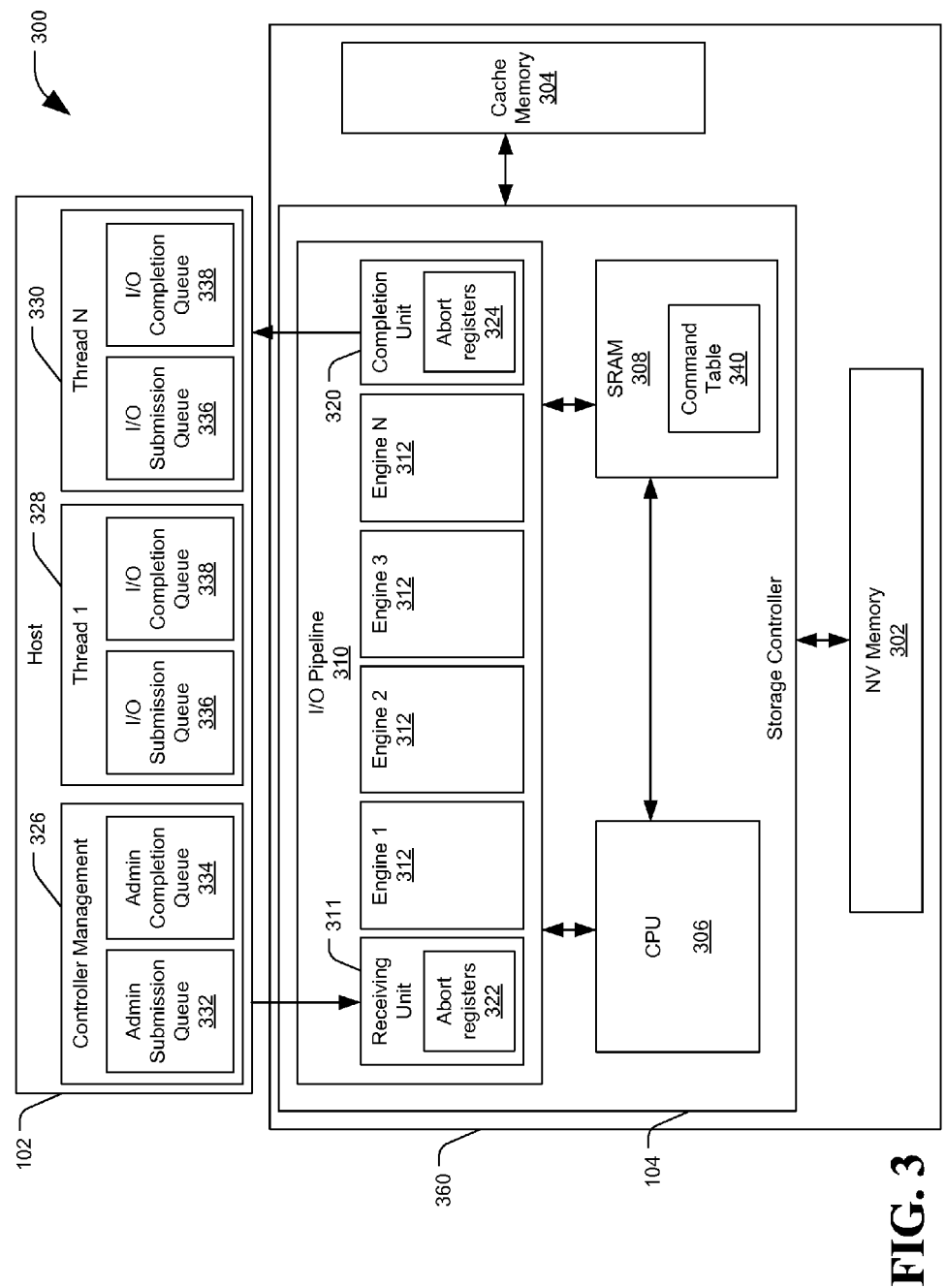
FIG. 3 is a diagram of a system configured to abort a command, in accordance with certain embodiments of the present disclosure.

FIG. 3 is a diagram of a system 300 configured to abort a command, in accordance with certain embodiments of the present disclosure. System 300 may include a host 102 and a storage controller 104, which may correspond to host 102 and storage controller 104 of FIG. 1, respectively. Storage controller 104 may be connected to one or more primary nonvolatile (NV) memories 302, such as a Flash solid state memory or a hard disc drive (HDD), one or more cache memories 304 such as dynamic random access memory (DRAM), other memories or components, or any combination thereof. In some embodiments, the storage controller 104, NV memory 302, and cache memory 304 may be included within a casing or housing 360 of a data storage device, which may be removable from host 102.

The storage controller 104 may be configured to receive commands from the host 102, perform processing based on the received commands, and return a result to the host 102. The storage controller 104 may include a CPU 306, an SRAM 308, and an input-output (I/O) pipeline 310. The CPU 306 may be used for general processing, for managing or coordinating processes within the storage controller 104, for other operations, or any combination thereof. The SRAM 308 may include operating memory for use by the storage controller 104 during processing and operation. For example, the SRAM 308 may store a command table 340 storing information regarding commands received for processing by the storage controller 104. The command table 104 may correspond to the command table described in regards to FIG. 2.

In some embodiments, the receiving unit 311 may correspond to the receiving unit 108 of FIG. 1. In some embodiments, the receiving unit 311 may receive commands from the host 102. For example, the receiving unit 311 may receive a command sent by the host 102, or the receiving unit 311 may receive an indicator that a command is available, and retrieve the command from the host 102. Other embodiments are also possible. In some embodiments, the receiving unit 311 may generate a command ID data structure based on received commands, and store the command ID data structure to the command table 340. In other embodiments, another component may generate and store the command ID data structure. The receiving unit may direct the command to a next component in the I/O pipeline 310 for processing, such as by sending the component an indicator to retrieve information on the command from the command table 340 and perform processing. Other embodiments are also possible.

The completion unit 320 may correspond to the completion unit 110 of FIG. 1. The completion unit 320 may receive a notification when the storage controller 104 has finished processing a command, and may send a notification to the host 102 that the command has been executed.

The I/O pipeline 310 may include a number of components or engines 312 configured to receive, process, and return a status for I/O commands received from the host 102. The engines 312 may include modules configured to perform one or more processing tasks related to a received command. In the depicted embodiment of FIG. 3, the I/O pipeline 310 may include N engines 312 in addition to the receiving unit 311 and the completion unit 320. A command received by the storage controller 104 may be handled by one or more of the N engines 312 in the I/O pipeline 310. For example, a command may be handled by each engine 312 in sequence, starting with engine 1 and ending with engine N, before the status of the command is reported to the host 102 by completion engine 320. The engines 312 may perform tasks such as checking a cache memory 304 for requested data, buffering commands pending execution, accessing attached memory components such as NV memory 302, performing other operations, or any combination thereof. Data may be passed between engines 312 of the I/O pipeline and between other components of the storage controller 104 via one or more data busses. The engines 312 and functions described herein are exemplary, and components and functions may be changed, added, or removed without departing from the scope of the present disclosure.

The host may issue input-output (I/O) commands and administrative commands for processing by the storage controller 104. In some examples, the storage controller 104 may be a nonvolatile memory express (NVMe) controller configured to receive commands through a Peripheral Component Interconnect Express (PCIe) bus, and may be configured to support parallel operation and multiple host command queues. NVMe devices may be configured to work with a paired submission queue (SQ) and completion queue (CQ) mechanism. SQs and CQs may be allocated in the host's 102 memory. Commands to be executed by the storage controller 104 may be placed into the SQs by software of the host 102. In some embodiments, commands may be retrieved from SQs by the receiving unit 311 of the storage controller 104. Completed commands may be placed into an associated CQ by the storage controller 104 (e.g. via the completion unit 320). Multiple SQs may utilize the same CQ. In some embodiments, SQs or CQs may be circular buffers with a fixed slot size that a host 102 may use to submit commands for execution by the storage controller 104.

In some embodiments, host 102 may include one or more modules for handling SQs and CQs. A "module" may be one or more physical components of a computing device (e.g., circuits and memories) configured to perform a particular task or job, or it may be a program that, when executed, causes a processor to perform the particular task or job. In the depicted embodiment, the modules may be processing threads, and the host 102 may comprise a computing device running N processing threads. The processing threads may include a controller management or "admin" thread 326, and additional processing threads 1 328 to processing thread N 330. Controller management module 326 may include one of the N processing threads, a separate processor circuit, a control module executed by one of N processing cores, another component, or any combination thereof. In some embodiments, the modules may include processor cores of a computing system, and each processor core may handle one or more SQ and CQ. In some embodiments, a computing core may support more than a single pair of SQs and CQs.

In some embodiments, a single CQ may be associated with multiple SQs. Other embodiments are also possible.

In some embodiments, the host 102 may create input-output (I/O) submission and completion queues, such as I/O SQs 336 and I/O CQs 338 for thread 1 328 and thread N 330. Queues may be created in a cache memory associated with each thread. I/O SQs 336 and CQs 338 may be used for data access commands, such as read commands, write commands, erase commands, other data access commands, or any combination thereof. The host 102 may also generate administrative, or "admin," SQs and CQs, such as admin SQ 332 and admin CQ 334 of the controller management module 326. Admin SQs 332 and CQs 334 may be used for admin commands from an administrative command set. Admin commands may be used for device management and control. For example, admin commands may be used to create and delete I/O SQs 336 and CQs 338, abort commands, identify an attached device (e.g. storage controller 104 or its associated data storage device), set device parameters, perform other administrative operations, or any combination thereof.

The host 102 may generate a command and place it as an entry into a submission queue, such as admin SQ 332 or I/O SQ 336. The command may include a command ID, a submission queue ID (SQID) identifying the SQ into which the command is placed, information identifying data to store to or retrieve from a storage device, other information, or any combination thereof. For example, a write I/O command may include the location of data stored to the host, which data can then be retrieved and stored to NV memory 302. An abort command may include its own command ID and SQ ID, and may also include the command ID and SQ ID for the selected command to be aborted. Other embodiments are also possible.

The host 102 may use the SQs to submit commands for execution by the storage controller 104. After placing a command into an SQ, the host 102 may send the storage controller 104 a "doorbell" or other indicator that a command is pending in an SQ. For example, the host 102 may update a doorbell register of the storage controller 104 associated with a submission queue when there are new commands to execute. A previous doorbell register value may be overwritten in the storage controller 104 when there is a new doorbell register write associated with a given submission queue. In some embodiments, the receiving unit 311 may include one or more doorbell registers, such as one or more registers which can be associated with each submission queue, up to a maximum number of submission queues supported by the storage controller 104. The receiving unit 311 may fetch a command from the submission queue based on the doorbell register. In some embodiments, the storage controller 104 may fetch commands from the host 102 in an order specified by the submission queue associated with the doorbell register. However, the storage controller 104 may execute received commands in any order.

An example process for handling an abort command is now described. The receiving unit 311 may determine whether a received command includes an abort command. Abort commands may include admin commands placed into the admin SQ 332. Abort commands may identify another selected command which is to be aborted. The selected command may be an I/O command, or another admin command. In addition to its own command ID, SQ ID, and other information identifying the abort command itself, the abort command may also include a command ID, an SQ ID, or other information identifying the selected command to abort.

When the receiving unit 311 receives an abort command, the receiving unit 311 may pass the command to the CPU 306. Based on the abort command, the CPU 306 may generate one or more abort indicators corresponding to the selected command at the receiving unit 311 or the completion unit 320. For example, the CPU 306 may update one or more abort registers 322 at the receiving unit 311, one or more abort registers 324 at the completion unit 320, or abort registers at both. In some embodiments, the receiving unit 311 and the completion unit 320 comprise circuits including a small amount of data storage dedicated to abort registers 322 and 324. The abort registers 322 and 324 may be updated with information identifying a selected command designated for aborting. For example, the abort registers 322 may be updated with a command ID of the selected command, an SQ or CQ associated with the selected command, other information, or any combination thereof. The receiving unit 311, the completion unit 320, or both may compare received commands against the information in the abort registers 322 and 324 to determine if any of the received commands are selected for aborting. For example, in some embodiments an abort command may be received by the storage controller 104 prior to the selected command which is to be aborted. The receiving unit 311 may then monitor incoming commands to determine whether any of those commands have been targeted for aborting by checking the abort registers 322. Similarly, the completion unit 320 may check completed commands against the abort registers 324 prior to notifying the host 102 that the commands have been completed. Accordingly, the completion unit 320 may catch commands selected for aborting as they are completed, and not send a command completed indicator to the host 102. When the receiving unit 311 or the completion unit 320 receive the selected command, they may notify the CPU 306 that the command was found and aborted.

In addition to setting the abort registers 322, 324, or both, the CPU 306 may search the command table 340 for the selected command. If the selected command is found in the command table 340, the CPU 306 may set an "abort" flag or bit in the selected command's data structure. When a component of the I/O pipeline 310 looks the selected command up in the command table 340, the component can detect that the "abort" bit has been set and may abort execution of the selected command. The component may send an indicator to the CPU 306 that the selected command has been aborted.

If the selected command is received after the CPU 306 searches the command table 350, the CPU 306 would not find the selected command in the table and could not set the abort bit. By setting an abort register 322 at the receiving unit 311, the storage controller 104 can account for instances where the selected command is received after the CPU 306 has searched the command table 340. If the storage controller 104 had finished processing the command before the CPU 306 located the command in the command table 340, setting the abort pending bit may be too late to abort the command. By setting an abort register 324 at the completion unit 320, the storage controller 104 can set the completion unit 320 to detect the command before searching the command table 340, potentially catching the command as it completes. Other embodiments are also possible.

When the CPU 306 receives an indication that the selected command has been aborted (e.g. from a component of the I/O pipeline 310), the CPU 306 may direct the completion unit 320 to post a completion indication for the abort command to the host 102. For example, the completion unit 320 may store an indication for the abort command to the admin CQ 334. In some embodiments, the completion unit 320 may also submit an indication that the selected command was aborted, for example by storing an abort indicator to an I/O CQ 338 associated with the selected command. Other embodiments are also possible.

In some embodiments, the selected command may never be located for aborting by the storage controller. For example, the selected command may have completed prior to setting an abort register 324 of the completion unit 320. In some embodiments, an addressing error or some other error may result in the storage controller 104 never receiving the selected command. In order to account for these possibilities, the receiving unit 311 may be configured to determine a number of incoming commands to check. If the selected command is not located in the command table 340, and is not received within the determined number of commands at the receiving unit 311, the storage controller 104 may cease attempts to abort the selected command. In some embodiments, the CPU 306 may direct the completion unit 320 to return a failure indication for the abort command.

In some embodiments, the receiving unit may determine the number of incoming commands to check against the abort registers 322 based on a number of commands in a submission queue (SQ) when the abort command is received. For example, the abort command may identify a submission queue ID (SQ ID) for the selected command to be aborted, indicating the SQ into which the selected command was placed by the host 102. After receiving the abort command, the CPU 306 may direct the receiving unit 311 to take a "snapshot" of the designated SQ to determine a number of outstanding commands in the designated SQ. It may be assumed that the host 102 would not issue an abort command corresponding to a command that had not yet been inserted into a SQ. Accordingly, if the selected command is still outstanding in an SQ and not yet received by the storage controller 104, then the selected command is one of the commands in the SQ at the time the abort command is received. Commands added to the SQ after that point may not need to be checked against the abort registers 322 when the commands are received. In some embodiments, the receiving unit may determine a number of commands in the SQ by comparing a tail pointer value to a head pointer value for the queue (e.g. assuming that new commands are added to the SQ at the tail of the queue, and commands are retrieved from the SQ by the receiving unit 311 from the head of the queue). If the difference between the head pointer value and the tail pointer value is, e.g. thirty-five commands, then the receiving unit 311 may compare the next thirty-five commands received from the designated SQ against the abort registers 322. If the selected command is not found within those thirty-five commands, the receiving unit may notify the CPU 306 that selected command has not been received from the SQ. In some embodiments, the receiving unit 311 may be configured to determine the designated number of commands to check automatically upon receiving an abort command, and may not need to receive an instruction from the CPU 306. Other embodiments are also possible.

In an example embodiment, upon receiving an abort command to abort a selected command, the CPU 306 may generate entries in abort registers 322 and 324 of the receiving unit 311 and the completion unit 320. The CPU 306 may also direct the receiving unit 311 to determine a number of incoming commands to check against the entries in the abort registers 322. The CPU 306 may search the command table 340 for an entry corresponding to the selected command. If a corresponding entry is found, the CPU 306 may set an abort flag to "true" for the selected command. If the CPU 306 receives an indicator that the selected command was found and aborted from the components of the I/O pipeline 310, a completion notification for the abort command may be returned to the host 102. If the selected command is not located in the command table 340, and the command is not received at the receiving unit 311 within a determined number of incoming commands, the CPU 306 may determine that the selected command either completed prior to receiving the abort notification, or that the selected command was not received by the storage controller 104. The storage controller 104 may return an indication that the abort command did not complete successfully. Other embodiments are also possible. Example methods of aborting a command are also discussed in relation to FIGS. 4 through 8.

Figure 4:
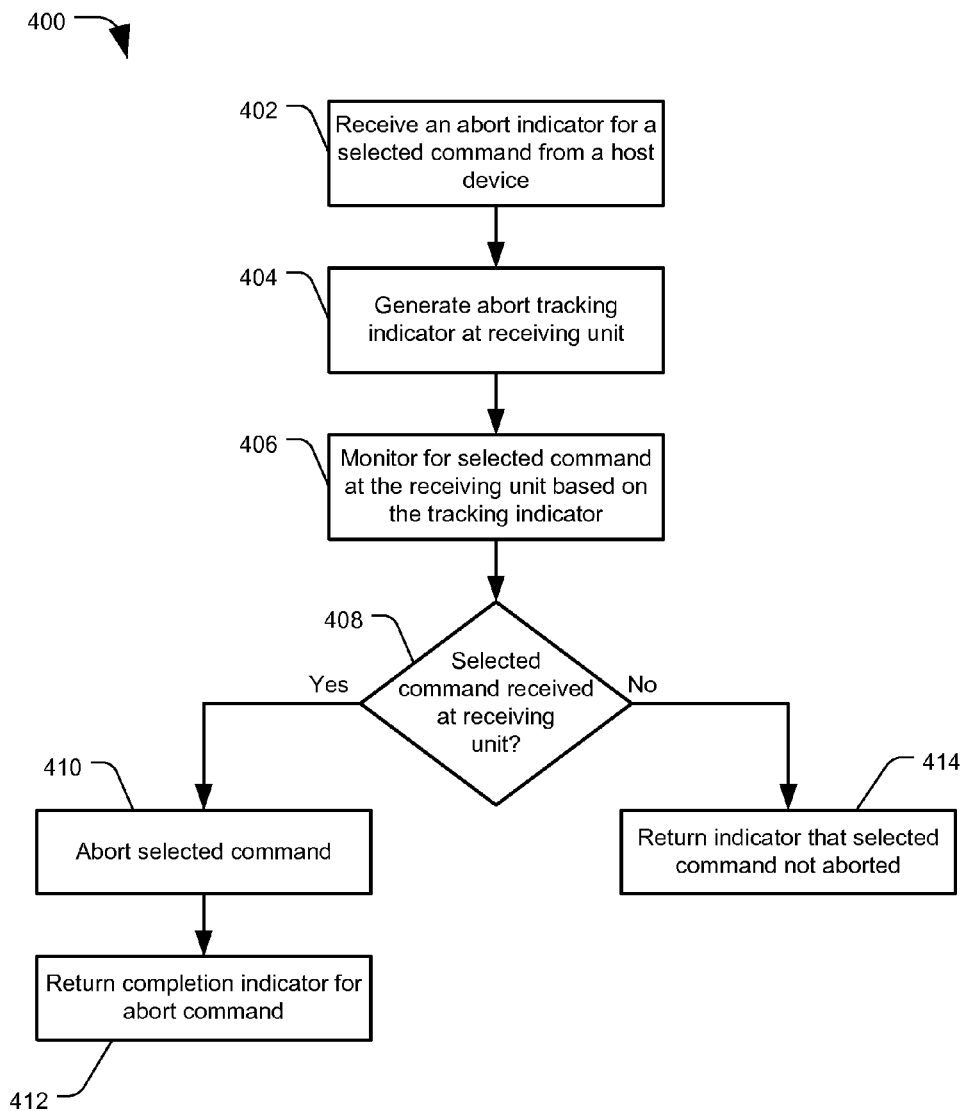
FIG. 4 is a flowchart of a method to abort a command, in accordance with certain embodiments of the present disclosure.

FIG. 4 is a flowchart of a method 400 to abort a command, in accordance with certain embodiments of the present disclosure. The method 400 may be performed by one or more components of a storage controller, such as storage controllers 104 of FIGS. 1 and 3. The method 400 may include receiving an abort indicator for a selected command from a host device, at 402. For example, a receiving unit of a storage controller may receive a doorbell indicator or other notice that an abort command is pending at a host, and the receiving unit may retrieve the abort command from the host. The abort command may include information identifying the selected command designated for aborting.

The method 400 may include generating an abort tracking indicator at the receiving unit, at 404. For example, the storage controller may update an abort register of the receiving unit with information identifying the selected command, such as a command ID, submission queue ID (SQ ID), or other identifying information. In some embodiments, information on the selected command may be stored to a RAM or other memory, and consulted by the receiving unit. Other embodiments are also possible. The method 400 may include monitoring for the selected command at the receiving unit based on the tracking indicator, at 406. For example, the receiving unit may compare the command ID and SQ ID of received commands against the command ID and SQ ID stored in an abort register of the receiving unit. The method 400 may include determining if the selected command has been received at the receiving unit, at 408. For example, if the command ID and SQ ID of a received command matches the command ID and SQ ID of the selected command, a match may be determined.

If the selected command has been received at the receiving unit, at 408, the method 400 may include aborting the selected command, at 410. For example, rather than forwarding the received command from the receiving unit to another component for further processing, the receiving unit may cease operations on the selected command and notify, e.g. a storage controller CPU that the selected command has been aborted. The method 400 may include returning a completion indicator for the abort command, at 412. For example, when the selected command has been aborted, the abort command has completed successfully. The storage controller may store a completion indicator for the abort command in a admin completion queue of the host device.

If the selected command was not received at the receiving unit, at 408, the method 400 may include returning an indicator that the selected command was not aborted, at 414. For example, the storage controller may determine a number of commands to check against the abort indicator for the selected command to determine whether the selected command has been received. In some embodiments, the number of commands may be based on a number of commands pending in a host submission queue when the abort command was received at the storage controller or when the abort command was placed into a submission queue. In some embodiments, the number of commands may be a preset number. For example, the number may correspond to a maximum number of commands which may be stored in a submission queue at any one time, based on another value, or any combination thereof. If the selected command is not received at the receiving unit, at 408, the storage controller may return a failure indicator for the abort command to the host. Other embodiments are also possible. For example, the selected command may be received at the storage controller prior to receipt of the abort command. In such embodiments, the selected command may still be aborted by other components of the storage controller even if the selected command is not received at the receiving unit after the abort command is received.

Figure 5:
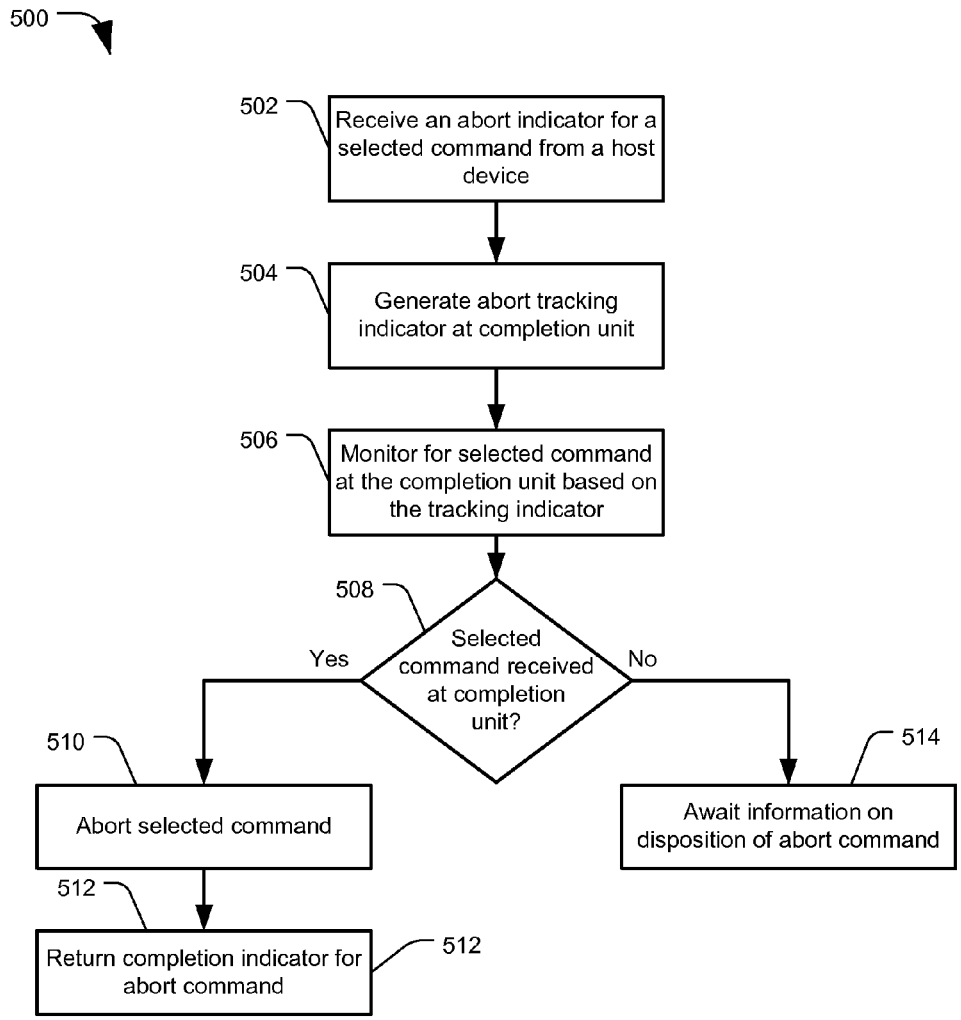
FIG. 5 is a flowchart of a method to abort a command, in accordance with certain embodiments of the present disclosure.

FIG. 5 is a flowchart of another method 500 to abort a command, in accordance with certain embodiments of the present disclosure. The method 500 of FIG. 5 may be performed by one or more components of a storage controller, such as storage controller 104 of FIGS. 1 and 3. Whereas FIG. 4 depicts an example method of aborting command by setting an abort tracking indicator at a receiving unit, FIG. 5 depicts an example method of aborting a command by setting an abort tracking indicator at a completion unit of a storage controller. In some embodiments, a storage controller may perform both methods 400 and 500 when receiving an abort command. Other embodiments are also possible.

Method 500 includes receiving an abort indicator for a selected command from a host device, at 502. For example, an abort command to abort the selected command may be received at a receiving unit of the storage controller. The receiving unit may pass the abort command to a CPU of the storage controller. At 504, the method 500 may include generating an abort tracking indicator at a completion unit of the storage controller. For example, the CPU may store information associated with the selected command to an abort register of the completion unit.

The method 500 may include monitoring for the selected command at the completion unit based on the tracking indicator, at 506. For example, the completion unit may receive notifications from components of the storage controller as commands are completed, and may notify the host of the completed commands. The completion unit may check each completing command against the abort tracking indicator to determine whether the completing command is the selected command and should be aborted. The method 500 may include determining whether the selected command has been received at the completion unit, at 508. If the selected command has been received, the method 500 may include aborting the selected command, at 510, and returning a completion indicator for the abort command to the host, at 512. The host may determine that the selected unit has been aborted based on the successful completion of the abort command.

If the selected command is not received at the completion unit, at 508, the method 500 may include awaiting further information on the disposition of the abort command, at 514. In some embodiments, the selected command may be aborted prior to reaching the completion unit, and therefore the abort command may complete successfully even if the selected command does not reach the completion unit. The completion unit may receive an indication from the CPU directing the completion unit to notify the host that the abort command was successful. In some embodiments, the selected command may not be located and the abort may fail (e.g. if the selected command completed before the abort command was received). The completion unit may receive an indication to clear the abort tracking indicator from the selected command from the abort register, instruction to notify the host that the abort was not successful, receive other instructions, or any combination thereof.

Figure 6:
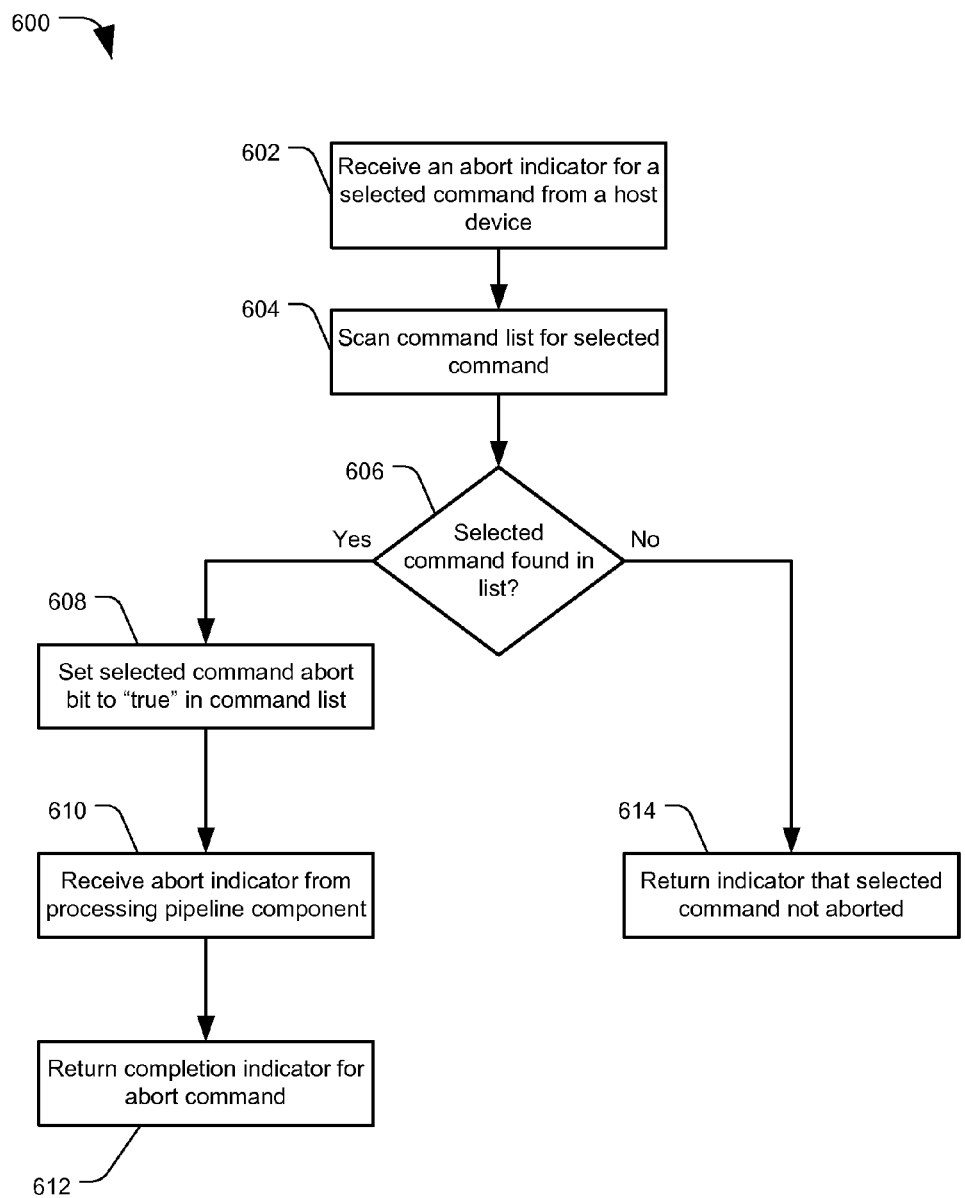
FIG. 6 is a flowchart of a method to abort a command, in accordance with certain embodiments of the present disclosure.

FIG. 6 is a flowchart of a method 600 to abort a command, in accordance with certain embodiments of the present disclosure. The method 600 may be performed by one or more components of a storage controller, such as storage controller 104 of FIGS. 1 and 3. In some embodiments, the method 600 may be performed in conjunction with method 400 of FIG. 4, method 500 of FIG. 5, or both. Other embodiments are also possible.

The method 600 may include receiving an abort indicator for a selected command from a host device, at 602. For example, a receiving unit of a storage controller may receive or fetch an abort command from the host, and pass the abort command to a CPU of the storage controller. At 604, the method 600 may include scanning a command list for the selected command. For example, the storage controller may maintain a table, list, or other collection of information regarding commands received at the storage controller. The command list may be stored to a RAM memory or other local data storage memory. In some embodiments, a CPU of the storage controller may scan through the commands in the command list to determine if any of the commands matches the selected command identified in the abort indicator.

The method 600 may include determining whether the selected command was found in the command list, at 606. If the selected command was in the list, the method 600 may include setting an abort bit or flag for the selected command to "true" in the command list. For example, the command list may include data structures corresponding to each command being processed at the storage controller, with the data structures including metadata about the commands. A data structure may include one or more bits or flags which can be toggled to indicate a status or other information about an associated command. In some embodiments, one or more bits or flags may include an abort bit, which may indicate that the selected command is targeted for aborting. As a command is processed at the storage controller, components of the storage controller may check the command table and determine whether the abort bit is set. When a component detects the set abort bit, the component may abort execution of the selected command, and in some embodiments the component may send an abort indicator to the CPU, or some other component, indicating that the selected command was aborted.

The method 600 may include receiving an abort indicator from a component of the processing pipeline, at 610. When the abort indicator is received, the method 600 may include returning a completion indicator for the abort command to the host at 612, for example via a completion unit of the storage controller.

If the selected command was never located in the command list, at 606, the abort command may have failed. In some embodiments, a determination of failure may be determined only after the selected command is not located in the command and after the receiving unit indicates that the selected command has not been received (e.g. step 414 of FIG. 4). Other embodiments are also possible. At 614, the method 600 may include returning an indicator to the host that the selected command was not aborted, that the abort command failed, another indicator, or any combination thereof.

Figure 7:
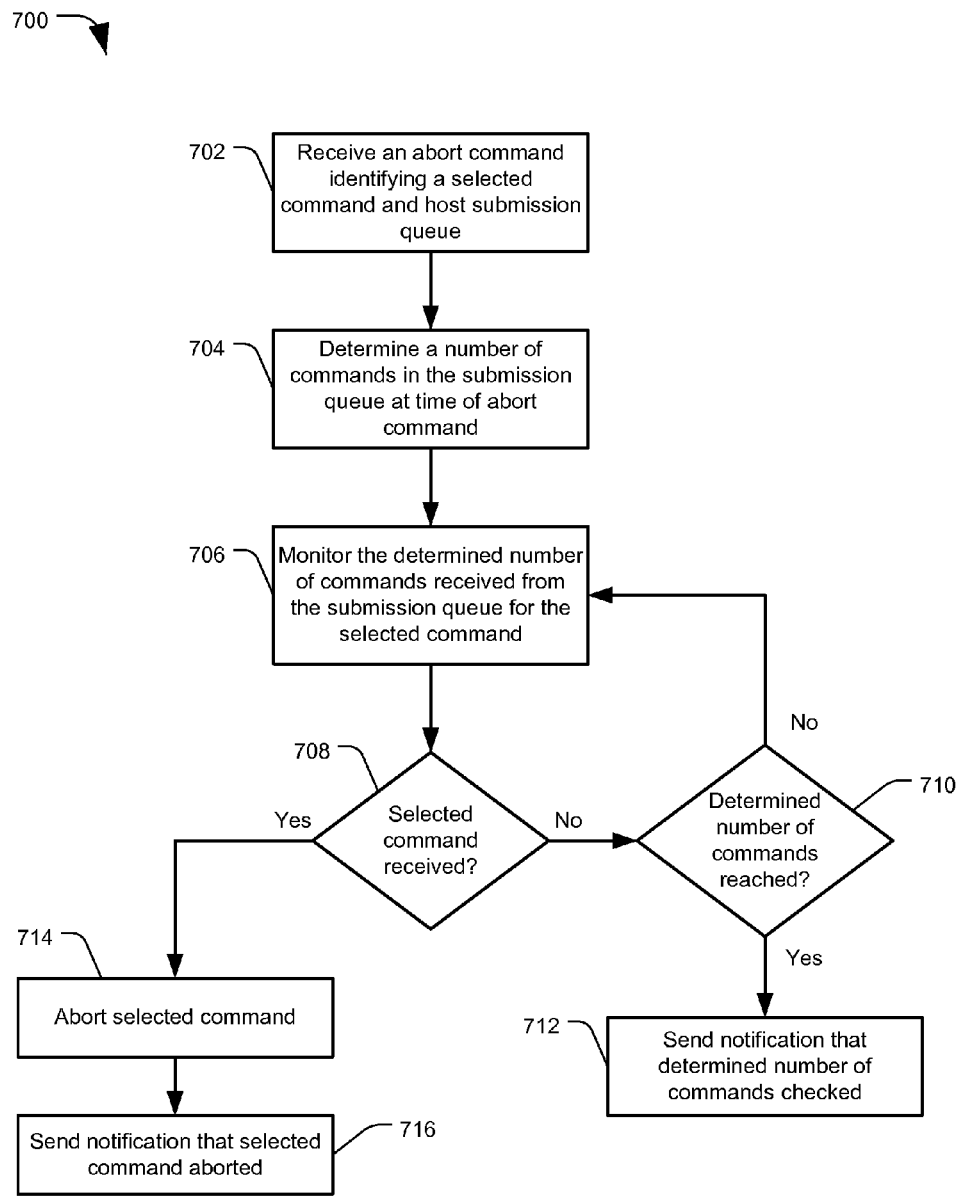
FIG. 7 is a flowchart of a method to abort a command, in accordance with certain embodiments of the present disclosure.

FIG. 7 is a flowchart of another method 700 to abort a command, in accordance with certain embodiments of the present disclosure. The method 700 may be performed by one or more components of a storage controller, such as storage controller 104 of FIGS. 1 and 3. In some embodiments, the method 700 may be performed in conjunction with method 400 of FIG. 4, method 500 of FIG. 5, method 600 of FIG. 6, or any combination thereof. Other embodiments are also possible.

Method 700 may include receiving an abort command from a host, at 702. The abort command may identify a selected command to abort and a host submission queue in which the selected command was placed pending retrieval by the storage controller. For example, the abort command may include a command ID for the selected command and a submission queue ID (SQ ID) for the queue into which the selected command was inserted.

The method 700 may include determining a number of commands in the submission queue at a time of the abort command, at 704. For example, a CPU of the storage controller may direct a receiving unit of the storage controller to determine an amount of commands in the submission queue corresponding to the selected command's SQ ID received with the abort command. In some embodiments, the receiving unit may determine the number of commands automatically upon receiving an abort command. Depending on the implementation, the storage controller may determine the number of commands as of the time the abort command was received, as of the time the abort command was inserted into a command queue, or based on other timing. In some embodiments, the number of commands may be determined based on a difference between a head pointer and a tail pointer for the submission queue. For example, the storage device controller or receiving unit may maintain and update submission queue head pointers, tail pointers, or both, or may receive information on one or more pointers from the host. The storage controller may use the head pointer to locate commands to retrieve from the submission queue. In an example embodiment, a head pointer may be maintained and updated by the storage controller when a command is consumed from a submission queue. The storage controller may receive a tail pointer as part of a command notification from the host. Other embodiments are also possible.

In some embodiments the host may only have a single command queue for all commands, or for all I/O commands, and the storage controller may not require the host to identify an SQ ID in order to determine the number of commands in the queue. In some embodiments, the storage controller may determine the number of pending commands in all submission queues, for example to account for the possibility that the SQ ID provided for the selected command was erroneous, and the selected command is in another queue.

The method 700 may include monitoring the determined number of incoming commands from the submission queue for the selected command, at 706. For example, the receiving unit can monitor each command received from the identified submission queue up to the determined number. For example, the receiving unit may compare each command received from the submission queue against the command ID received with the abort command, in order to determine if any of the received commands are the selected command identified for aborting. The storage controller, e.g. at the receiving unit, may store a counter associated with the monitored submission queue, or associated with an abort register for the selected command. The receiving unit may increment the counter when a command from the monitored submission queue is checked.

The method 700 may include determining if the selected command has been received, at 708. For example, if the received command's command ID matches the selected command's command ID, the storage controller may determine that the selected command has been received. If the selected command was not received, the method 700 may include determining if the number of commands determined at 704 have been checked, at 710. For example, if the counter maintained by the storage controller equals or exceeds the number of commands that where in the submission queue at the time of the abort command, the storage controller may determine that the identified number of commands have been checked.

If the determined number of commands has not been reached, at 710, the method 700 may resume monitoring the received commands, at 706. If the determined number of commands has been reached, at 710, the method 700 may include sending a notification that the determined number of commands has been checked. For example, a receiving unit may notify a CPU of the storage controller that the determined number has been checked. The CPU may determine whether the abort command has failed based on the notification and other potential abort processes. In some embodiments, the notification may be sent to the host, for example as part of a failure indication for the abort command. Other embodiments are also possible.

If the selected command has been received, at 708, the method 700 may include aborting the selected command, at 714. For example, the receiving unit may not forward the command for further processing, and in some embodiments may notify a CPU of the storage controller that the selected command was found and aborted. At 716, the method 700 may include sending a notification that the selected command was aborted. In some embodiments, a CPU of the storage controller may direct a completion unit to insert a completion indicator for the abort command into a completion queue of the host device. Other embodiments are also possible.

Figure 8:
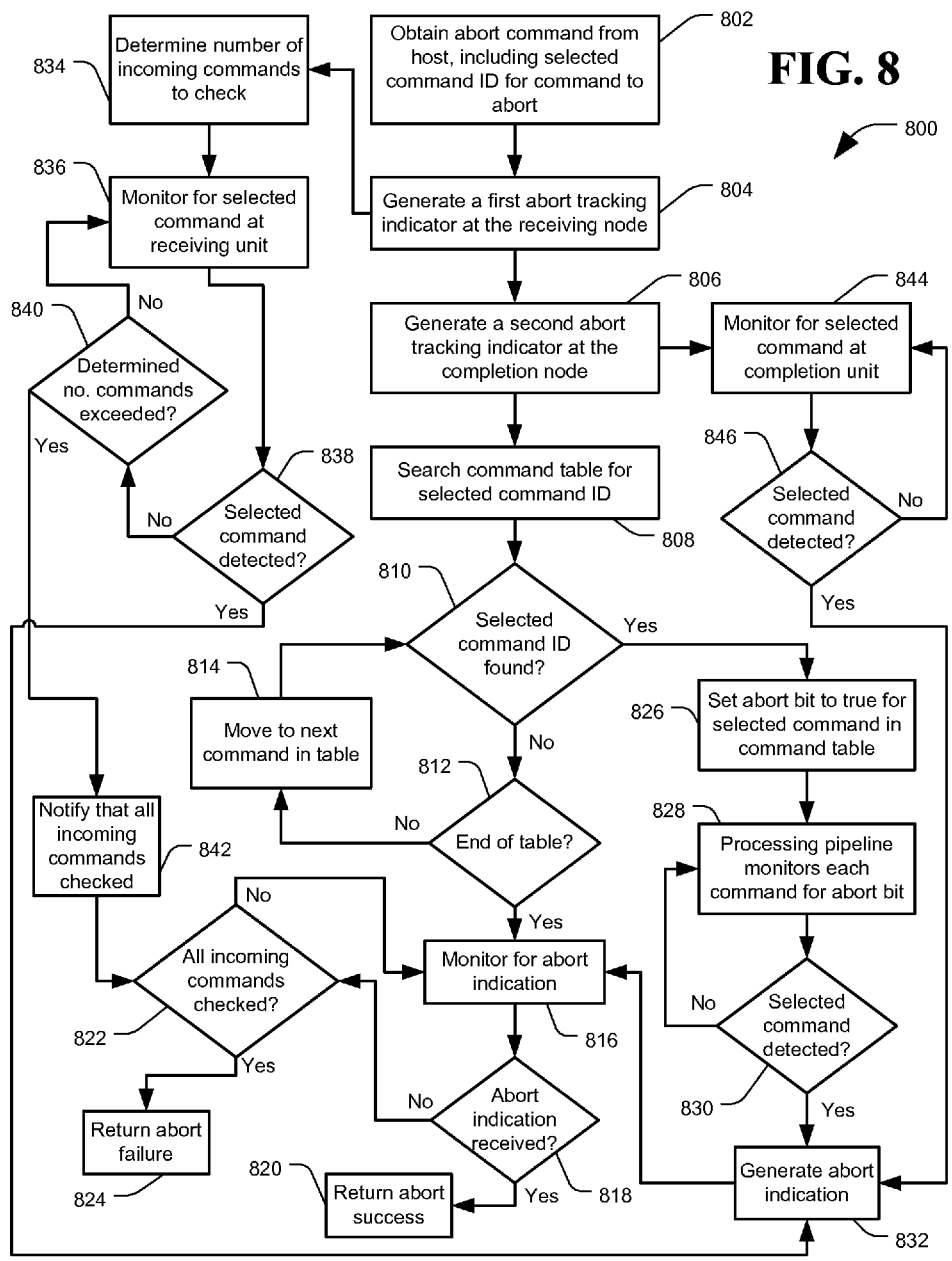
FIG. 8 is a flowchart of a method to abort a command, in accordance with certain embodiments of the present disclosure.

FIG. 8 is a flowchart of another method 800 to abort a command, in accordance with certain embodiments of the present disclosure. In some embodiments, method 800 may incorporate elements of methods 400 through 700 of FIGS. 4 through 7, respectively. In some embodiments, examples provided in regard to previous figures and embodiments may apply the method 800 as well.

The method 800 may include obtaining an abort command from a host at 802, the abort command including a command ID for a selected command identified for aborting. In some embodiments, the abort command may be sent to or fetched by a receiving unit of a storage controller. The receiving unit may notify a CPU of the storage controller that the abort command was received.

Based on receiving the abort command, the method 800 may include generating a first abort tracking indicator at the receiving unit, at 804, and generating a second abort tracking indicator at a completion unit of the storage controller, at 806. For example, the CPU of the storage controller may set an abort register at the receiving unit, and another abort register at the completion unit. One or both of the receiving unit and completion unit may include one or more registers configured to store data about a selected command identified by an abort command. Accordingly, the first abort tracking indicator and the second abort tracking indicator may include data identifying the selected command stored to registers of the receiving unit and the completion unit.

The method 800 may include searching a command table for the selected command ID, at 808. For example, the storage controller may maintain a table storing data about commands received by the storage controller. A CPU for the storage controller may search the table to determine if a command having an ID matching the selected command ID has already been received and added to the command table. In some embodiments, the CPU may search the command table one entry at a time, may search received commands based on age (e.g. from the least-recently received command to the most-recently received command), or based on some other search criteria.

The method 800 may include determining if the command ID of the current command table entry matches the selected command ID, at 810. If not, the method 800 may include determining if the search has reached the end of the command table (e.g. whether all commands in the table have been searched), at 812. If not, the method 800 may include moving to the next command in the table, at 814, and determining if that command matches the selected command, at 810. If the end of the command table has been reached, at 812, the method 800 may include monitoring for an abort indication, at 816. For example, the storage controller may be configured such that components of the storage controller send an abort indication to the CPU of the storage controller when a command is aborted. The CPU may therefore monitor for received abort indication from components of the storage controller. The method 800 may include determining if the abort indication was received, at 818. If so, the method 800 may include returning abort success, e.g. to t host, at 820.

If an abort indication was not received, at 818, the method 800 may include determining if all incoming commands have been checked, at 822. In some embodiments, the number of incoming commands checked may depend on a number of commands that were in a submission queue at the time the abort command was received or generated. If all incoming commands have not yet been checked, at 822, the method 800 may include resuming monitoring for abort indications, at 816. If all incoming commands have been checked, the method 800 may include returning an abort failure notification, e.g. to the host, at 824. For example, if the selected command ID was not found in the command table, and the command was not located by the receiving unit after checking the determined number of incoming commands, the system may generate an abort failure notification.

If selected command was located in the table of commands, at 810, the method 800 may include setting an abort bit to true the selected command in the command table. For example, each command entry in the command table may include one or more pieces of metadata information, including a bit or flag which can be used to mark the command as selected for aborting. Components of a processing pipeline of the storage controller may consult the command table for each command to determine whether the command is set for aborting, at 828. The method 800 may include determining if the selected command is detected by one of the processing pipeline components, at 830, for example based on the abort bit being set for a current command. If not, the processing pipeline components may continue processing and monitoring commands, at 828. If the selected command is detected, at 830, the method 800 may include generating an abort indication, at 832. For example, the processing components may cease further processing on the selected command, and may notify the CPU of the storage controller that the selected command was located and aborted. The abort indication may be received by the CPU at 816, as described above.

After generating the first abort tracking indicator at the receiving unit, at 804, the method 800 may include determining a number of incoming commands to check for the selected command, at 834. For example, the CPU of the storage controller may direct the receiving unit to count a number of commands in a submission queue on the host device. In some embodiments, the submission queue may be the submission queue in which the selected command was entered, which submission queue may have been identified in the received abort command. The number of commands in the submission queue may be determined when the abort command is received (e.g. based on a direction from the storage controller CPU, or performed automatically by the receiving unit), based on when the abort command was generated, based on other factors, or any combination thereof.

The method 800 may include monitoring for the selected command at the receiving unit, at 836. For example, each received command may be compared against the first abort tracking indicator. In some embodiments, only commands received from a particular submission queue may be compared against the abort tracking indicator. The method 800 may include determining whether the selected command was detected, at 838. For example, the command ID of an incoming command may match the command ID of the selected command stored as part of the first abort tracking indicator. If the selected command is detected, the method 800 may include aborting the command and generating an abort indication, at 832.

If the selected command was not detected, at 838, the method 800 may include determining whether the number of commands determined at 834 has been met or exceeded, at 840. For example, the receiving unit may increment a counter every time a relevant command is checked, and the counter may be compared to the number of commands that were in the submission queue when the abort command was received. If the determined number of commands have not been exceeded, the method 800 may include continuing to monitor incoming commands for the selected command, at 836. If the determined number of commands have been exceeded, the method 800 may include generating a notification that all relevant incoming commands from the appropriate submission queue have been checked without finding the selected command, at 842. An indication that all commands have been checked may indicate that the selected command was already received by the storage controller before the receiving unit started checking incoming commands, or that the selected command is not going to be received by the storage controller. The notification that all commands were checked may be used by the CPU to determine whether the abort command failed, at 822 and 824.

After generating the second abort tracking indicator at the completion unit, at 806, the method 800 may include monitoring for the selected command at the completion unit, at 844. For example, the completion unit may receive a notice from the storage controller processing pipeline for each completed command, and may generate completion notifications to send to the host. The completion unit may be configured to compare each completed command (or some subset of commands, such as those having a matching SQ ID to the selected command) to the abort tracking indicator. The method 800 may include determining whether the selected command has been detected, at 846. If the selected command is not detected, the method 800 may include continuing to monitor for the selected command, at 844. If the selected command is detected, at 846, the method 800 may include generating an abort indication at 832.

Using the methods disclosed herein, a storage controller may monitor incoming commands, completing commands, and processing commands for a command selected for aborting. The storage controller may locate and abort the command even in out-of-order processing environments, and without interrupting processing for other commands. The depicted methods and systems are exemplary, and modifications, exclusions, or additions may be made to the methods and systems without departing from the scope of this disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a data storage controller configured to:
        maintain a table of commands received from the host device, the table of commands including data structures for each command being processed by the data storage controller;
        receive an abort indicator from a host device, the abort indicator identifying a selected command to be aborted;
        generate a first abort tracking indicator at a receiving unit configured to receive commands from the host device, the first abort tracking indicator corresponding to the selected command and directing the receiving unit to compare incoming commands against the selected command identified by the abort tracking indicator;
        monitor to determine when the selected command is received at the receiving unit based on the first abort tracking indicator;
        abort the selected command when the selected command is received at the receiving unit;
        search the table of commands for a data structure corresponding to the selected command;
        when the selected command is located in the table of commands:
            set an abort flag for the data structure corresponding to the selected command in the table of commands;
            access the table of commands using a component of a processing pipeline of the data storage controller when the component receives a pending command for processing;
            abort execution of the pending command when the abort flag is set for the pending command;
        when the selected command is not located in the table of commands:
            determine whether the receiving unit has monitored a set number of received commands; and
            generate an abort failure notification based on the receiving unit monitoring the set number of received commands.

2. The apparatus of claim 1 further comprising:
    the first abort tracking indicator includes an entry in an abort register of a memory of the receiving unit.

3. The apparatus of claim 1 comprising the data storage controller further configured to:
    determine a number of commands in a selected submission queue located in a memory of the host device based on the received abort indicator; and
    monitor the number of commands received from the selected submission queue for the selected command.

4. The apparatus of claim 3 comprising the data storage controller further configured to:
    receive, included with the abort indicator, a submission queue identifier associated with the selected command, the submission queue identifier designating the selected submission queue from a plurality of submission queues of the host device.

5. The apparatus of claim 3 further comprising:
    the set number of commands monitored at the receiving unit for generating the abort failure notification is based on the number of commands in the selected submission queue when the abort indicator was received.

6. The apparatus of claim 1 comprising the data storage controller further configured to:
    generate a second abort tracking indicator at a completion unit configured to notify the host device of completed commands;
    monitor for the selected command at the completion unit based on the second abort tracking indicator; and
    abort the selected command when the selected command is received at the completion unit.

7. The apparatus of claim 6 further comprising:
    the completion unit includes a circuit having a memory; and
    the second abort tracking indicator includes an entry in an abort register of the memory of the completion unit.

8. An apparatus comprising:
    a data storage controller configured to:
        receive an abort indicator from a host device, the abort indicator identifying a selected command to be aborted;
        generate a first abort tracking indicator at a completion unit configured to notify the host device of completed commands;
        monitor for the selected command at the completion unit based on the first abort tracking indicator;
        abort the selected command when the selected command is received at the completion unit;
        maintain a table of commands received from the host device, the table of commands including data structures for each command being processed by the data storage controller;
        set an abort flag for the data structure corresponding to the selected command in the table of commands;
        access the table of commands using a component of a processing pipeline of the data storage controller when the component receives a pending command for processing; and
        abort execution of the pending command when the abort flag is set for the pending command.

9. The apparatus of claim 8 further comprising:
the completion unit includes a circuit having a memory; and
the first abort tracking indicator includes an entry in an abort register of the memory of the completion unit.

10. The apparatus of claim 8 comprising the data storage controller further configured to:
generate a second abort tracking indicator at a receiving unit configured to receive commands from the host device;
monitor to determine when the selected command is received at the receiving unit based on the second abort tracking indicator; and
abort the selected command when the selected command is received at the receiving unit.

11. The apparatus of claim 10 comprising the data storage controller further configured to:
determine, using the receiving unit, a number of commands in a selected submission queue located in a memory of the host device based on when the abort indicator was received at the data storage controller;
monitor the number of commands received from the selected submission queue for the selected command; and
stop monitoring commands from the selected submission queue for the selected command after monitoring the number of commands.

12. The apparatus of claim 11 comprising the data storage controller further configured to:
receive, included with the abort indicator, a submission queue identifier associated with the selected command, the submission queue identifier designating the selected submission queue from a plurality of submission queues of the host device.

13. The apparatus of claim 8 comprising the data storage controller further configured to:
search the table of commands for the data structure corresponding to the selected command;
set the abort flag when the selected command is located in the table of commands;
when the selected command is not located in the table of commands:
determine whether the receiving unit has monitored a set number received commands; and
generate an abort failure notification based on the receiving unit monitoring the set number of received commands.

14. The apparatus of claim 8 further comprising:
the data storage controller is a controller for a solid-state drive.

15. The apparatus of claim 14 further comprising:
the solid state drive includes a nonvolatile memory express (NVMe) storage device.

16. The apparatus of claim 15 further comprising:
the NVMe storage device is configured to communicate with the host via a peripheral component interconnect express (PCIe) communication bus.

17. A method comprising:
receiving an abort command from a host device at a receiving circuit of a data storage controller, the abort command identifying a selected command to be aborted;
the receiving circuit configured to receive commands from the host device;
generating a first abort tracking indicator at the receiving circuit;
monitoring to determine when the selected command is received at the receiving circuit based on the first abort tracking indicator;
generating a second abort tracking indicator at a completion circuit configured to notify the host device of completed commands;
monitoring for the selected command at the completion circuit based on the second abort tracking indicator;
aborting the selected command when the selected command is received at the receiving circuit or the completion circuit;
maintaining a table of commands received from the host device, the table of commands including data structures for each command being processed by the data storage controller;
searching the table of commands for a data structure corresponding to the selected command;
setting an abort flag for the data structure corresponding to the selected command in the table of commands when the selected command is located in the table of commands;
accessing the table of commands using a component of a processing pipeline of the data storage controller when the component receives a pending command for processing; and
aborting execution of the pending command when the abort flag is set for the pending command.

18. The method of claim 17 further comprising:
receiving, with the abort command, a submission queue identifier designating a selected submission queue stored at the host device, the selected command received from the host via the selected submission queue;
determining a number of commands in the selected submission queue based on the received abort command; and
checking the determined number of commands received from the selected submission queue to determine whether the commands match the selected command.

19. The method of claim 17 further comprising:
when the selected command is not located in the table of commands:
determining whether the receiving circuit has monitored a set number received commands corresponding to a number of commands pending when the abort command was received; and
generating an abort failure notification based on the receiving circuit monitoring the set number of received commands without locating the selected command.

20. The method of claim 17 further comprising receiving the abort command prior to receiving the selected command.

* * * * *